(12) United States Patent
Friszell et al.

(10) Patent No.: US 10,527,252 B2
(45) Date of Patent: Jan. 7, 2020

(54) APPLICATION OF ELECTROCHROMIC POLYMERS AS COLOR AND OPACITY LIGHT FILTERS

(71) Applicant: GM Global Technology Operations LLC, Detroit, MI (US)

(72) Inventors: Nicholas V. Friszell, Oxford, MI (US); Gregory M. Castillo, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 280 days.

(21) Appl. No.: 15/440,519

(22) Filed: Feb. 23, 2017

(65) Prior Publication Data
US 2018/0238517 A1   Aug. 23, 2018

(51) Int. Cl.
| F21V 9/00 | (2018.01) |
| F21S 41/64 | (2018.01) |
| F21S 41/663 | (2018.01) |
| F21S 43/20 | (2018.01) |
| G02F 1/157 | (2006.01) |
| G02F 1/163 | (2006.01) |
| G02F 1/1516 | (2019.01) |
| F21W 103/20 | (2018.01) |
| F21W 106/00 | (2018.01) |
| F21W 102/00 | (2018.01) |
| F21W 103/00 | (2018.01) |

(52) U.S. Cl.
CPC .......... *F21S 41/645* (2018.01); *F21S 41/663* (2018.01); *F21S 43/255* (2018.01); *G02F 1/157* (2013.01); *G02F 1/163* (2013.01); *F21W 2102/00* (2018.01); *F21W 2103/00* (2018.01); *F21W 2103/20* (2018.01); *F21W 2106/00* (2018.01); *G02F 1/15165* (2019.01)

(58) Field of Classification Search
CPC ................ B60Q 1/143; B60Q 2300/42; B60Q 2300/41; B60Q 2300/056
See application file for complete search history.

(56) References Cited

U.S. PATENT DOCUMENTS

| 2011/0029194 | A1* | 2/2011 | Brown ..................... B60Q 1/14 701/36 |
| 2014/0328078 | A1* | 11/2014 | Williams .............. F21S 41/141 362/512 |
| 2015/0036373 | A1* | 2/2015 | Chen ....................... G02F 1/153 362/516 |

* cited by examiner

Primary Examiner — Andrew J Coughlin
(74) Attorney, Agent, or Firm — Cantor Colburn LLP

(57) ABSTRACT

A vehicle lighting system includes a light source; a first lighting subsystem includes a first light path having a first end positioned to receive light from the light source and to deliver the light to a second end of the first light path; and a first electrochromic filter disposed in the first light path; and a second lighting subsystem includes a second light path having a first end positioned to receive light from the light source and to deliver the light to a second end of the second light path; and a second electrochromic filter disposed in the second light path, wherein the first lighting subsystem provides a first lighting function, and wherein the second lighting subsystem provides a second lighting function.

20 Claims, 3 Drawing Sheets

APPLICATION OF ELECTROCHROMIC POLYMERS AS COLOR AND OPACITY LIGHT FILTERS

The subject disclosure relates to an automotive lighting system including an electrochromic polymer filter.

External and internal vehicle lighting is used to provide frontal illumination during the day and night, positional indication, brake functions, turn signaling, and other essential automotive functions. Government regulations typically require that vehicle lighting adhere to particular standards related to placement, color, intensity, and photometric performance. Thus, there are challenges associated with developing comprehensive lighting systems that comply with government standards, that match the style of the vehicle, and that appeal to consumers.

For exterior and interior automotive lighting, it is generally necessary to use different colored light sources to illuminate a given lens and to activate different functions of the lamp at different times. This approach is guided by careful color matching between the light source output and regulated lamp colors. The light sources delivered by suppliers may need fine-tuning to obtain the desired light output, and it is often necessary to use more than one colored light source. Additionally, the costs associated with changing the intensity, for example using pulse width modulation, are great and significant heat can be generated.

Accordingly, it is desirable to provide a unified lighting system where a single colored light source can provide an output with varied colors.

SUMMARY

In one exemplary embodiment a vehicle lighting system includes a light source; a first lighting subsystem includes a first light path having a first end positioned to receive light from the light source and to deliver the light to a second end of the first light path; and a first electrochromic filter disposed in the first light path; and a second lighting subsystem includes a second light path having a first end positioned to receive light from the light source and to deliver the light to a second end of the second light path; and a second electrochromic filter disposed in the second light path, wherein the first lighting subsystem provides a first lighting function, and wherein the second lighting subsystem provides a second lighting function.

In another embodiment, at least one of the first light path and the second light path further comprises a bend that is configured to change a direction of light from a first direction to a second direction, wherein the second direction is different than the first direction.

In another embodiment, each of the first electrochromic filter and the second electrochromic filter is independently switchable between a condition in which it at least partially absorbs visible light and a condition in which it is substantially permeable to visible light based on an applied opacity voltage, wherein the applied opacity voltage is optionally applied according to a predefined timing sequence.

In another embodiment, a color of each of the first electrochromic filter and the second electrochromic filter is independently tunable based on an applied color voltage, wherein the applied color voltage is optionally applied according to a predefined timing sequence.

In another embodiment, the first electrochromic filter and the second electrochromic filter each independently has a thickness of about 0.001 millimeters to about 10 millimeters.

In another embodiment, the first electrochromic filter and the second electrochromic filter each independently comprises at least one electrochromic polymer layer.

In another embodiment, the system further includes a microelectronic controller and a voltage source.

In another embodiment, the light source, the first electrochromic filter, and the second electrochromic filter can each be actuated independently from each other during operation of the system.

In another embodiment, the system further includes a mounting surface.

In another embodiment, the first lighting function is an interior light, a headlamp, a tail light, a turn signal, a side marker, or a parking light, and wherein the second lighting function is an interior light, a headlamp, a tail light, a turn signal, a side marker, daytime running lamp, position indicator, or a parking light.

In another exemplary embodiment, a vehicle lighting system includes a light source; a first lighting subsystem includes a first light path having a first end positioned to receive light from the light source and to deliver the light to a second end of the first light path; a first electrochromic filter disposed in the first light path; and a third electrochromic filter disposed in the first light path; and a second lighting subsystem includes a second light path having a first end positioned to receive light from the light source and to deliver the light to a second end of the second light path; a second electrochromic filter disposed in the second light path; and a fourth electrochromic filter disposed in the second light path, wherein the first lighting subsystem provides a first lighting function, wherein the second lighting subsystem provides a second lighting function.

In another embodiment, at least one of the first light path and the second light path further comprises a bend that is configured to change a direction of light from a first direction to a second direction, wherein the second direction is different than the first direction.

In another embodiment, each of the first electrochromic filter and the second electrochromic filter is independently switchable between a condition in which it at least partially absorbs visible light and a condition in which it is substantially permeable to visible light based on an applied opacity voltage, wherein the applied opacity voltage is optionally applied according to a predefined timing sequence.

In another embodiment, a color of each of the third electrochromic filter and the fourth electrochromic filter is independently tunable based on an applied color voltage, wherein the applied color voltage is optionally applied according to a predefined timing sequence.

In another embodiment, the first electrochromic filter is positioned downstream of the third electrochromic filter in the first light path, and the second electrochromic filter is positioned downstream of the fourth electrochromic filter in the second light path.

In another embodiment, the third electrochromic filter is positioned downstream of the first electro chromic filter in the first light path, and the fourth electrochromic filter is positioned downstream of the second electrochromic filter in the second light path.

In yet another exemplary embodiment, a method for providing vehicle lighting includes producing a light with a light source; transmitting a first portion of the light to a first lighting subsystem, the first lighting subsystem includes a first light path having a first end that receives the first portion of the light from the light source and directs the first portion of the light to a second end of the first light path; and a first electrochromic filter disposed in the first light path; and transmitting a second portion of the light to a second lighting subsystem, the second lighting subsystem includes a second light path having a first end that receives the second portion of the light from the light source and directs the second portion of the light to a second end of the second light path; and a second electrochromic filter disposed in the second light path, wherein the first lighting subsystem provides a first lighting function, and wherein the second lighting subsystem provides a second lighting function.

In another embodiment, the method further includes changing an opacity of the first electrochromic filter or the second electrochromic filter by applying an opacity voltage to the first electrochromic filter or the second electrochromic filter.

In another embodiment, the method further includes changing a color of at least one of the first electrochromic filter and the second electrochromic filter by applying a color voltage to the at least one of the first electrochromic filter and the second electrochromic filter.

In another embodiment, the method further includes independently actuating each of the light source, the first electrochromic filter, and the second electrochromic filter.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
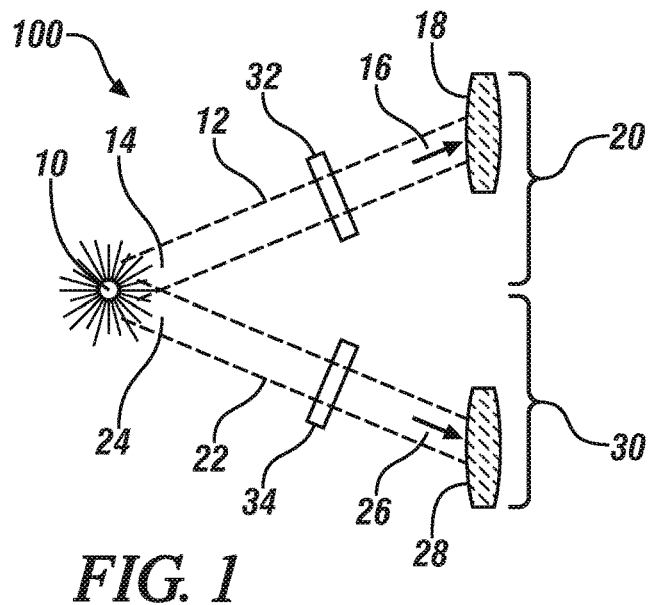
FIG. 1 is a schematic view of a lighting system according to an embodiment of the present disclosure.

The following description is merely exemplary in nature and is not intended to limit the present disclosure, its application or uses. It should be understood that throughout the drawings, corresponding reference numerals indicate like or corresponding parts and features.

The presence of stated features, regions, integers, steps, operations, elements, and/or components, but do not preclude the presence or addition of one or more other features, regions, integers, steps, operations, elements, components, and/or groups thereof.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the present disclosure.

Exemplary embodiments of the present disclosure are described herein with reference to cross section illustrations that are schematic illustrations of idealized embodiments of the present disclosure. As such, variations from the shapes of the illustrations as a result, for example, of manufacturing techniques and/or tolerances, are to be expected. Thus, embodiments of the present disclosure should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "polymer" refers to the product of a polymerization reaction, and is inclusive of homopolymers, copolymers, terpolymers, and the like.

As used herein, the term "homopolymer" means a polymer resulting from the polymerization of a single monomer.

As used herein, the term "copolymer" means a polymer resulting from the polymerization of at least two different monomers.

A polyaniline polymer is polymerized from an aniline monomer. As used herein, an aniline monomer is selected from aniline or an aniline derivative. An aniline derivative is an aniline molecule which contains at least one substituent group on the aromatic ring. As used herein, the term "polyaniline polymer" refers to polymers containing as polymerized units, one or more aniline monomers.

A polynorbornene polymer is polymerized from a norbornene monomer. As used herein, a norbornene monomer is selected from norbornene or a norbornene derivative. A norbornene derivative is a norbornene molecule which contains at least one substituent group. As used herein, the term "polynorbornene polymer" refers to polymers containing as polymerized units, one or more norbornene monomers.

A polyamide polymer is polymerized from an amide monomer. As used herein, an amide monomer is selected from amide or an amide derivative. An amide derivative is an amide molecule which contains at least one substituent group. As used herein, the term "polyamide polymer" refers to polymers containing as polymerized units, one or more amide monomers.

A polyamine polymer is polymerized from an amine monomer. As used herein, an amine monomer is selected from amine or an amine derivative. An amine derivative is an amine molecule which contains at least one substituent group. As used herein, the term "polyamine polymer" refers to polymers containing as polymerized units, one or more amine monomers. Non-limiting examples of a polyamine polymer are poly-o-phenylenediamine, poly-m-phenylenediamine, and the like.

A polyimide polymer is polymerized from an imide monomer. As used herein, an imide monomer is selected from imide or an imide derivative. An imide derivative is an imide molecule which contains at least one substituent group. As used herein, the term "polyimide polymer" refers to polymers containing as polymerized units, one or more imide monomers.

A polythiophene polymer is polymerized from a thiophene monomer. As used herein, a thiophene monomer is selected from thiophene or a thiophene derivative. A thiophene derivative is a thiophene molecule which contains at least one substituent group. As used herein, the term "polythiophene polymer" refers to polymers containing as polymerized units, one or more thiophene monomers. Non-limiting examples of polythiophene polymers are poly(3-methyl thiophene), 3,4-polyethylene dioxythiophene, and the like.

A polypyrrole polymer is polymerized from a pyrrole monomer. As used herein, a pyrrole monomer is selected from pyrrole or a pyrrole derivative. A pyrrole derivative is a pyrrole molecule which contains at least one substituent group. As used herein, the term "polypyrrole polymer" refers to polymers containing as polymerized units, one or more pyrrole monomers. Non-limiting examples of polypyrroles are 3,4-polyethylene dioxypyrrole, poly(3,4-(2,2-dimethylpropylenedioxy)-pyrrole), and the like.

A polycarbazole polymer is polymerized from a carbazole monomer. As used herein, a carbazole monomer is selected from carbazole or a carbazole derivative. A carbazole derivative is a carbazole molecule which contains at least one substituent group. As used herein, the term "polycarbazole polymer" refers to polymers containing as polymerized units, one or more carbazole monomers. A non-limiting example is poly(3,6-bis(3,4-ethylenedioxy)thienyl)-N-methylcarbazole).

A polyarylene polymer is polymerized from an arylene monomer. As used herein, an arylene monomer is selected from arylene or an arylene derivative. An arylene derivative is an arylene molecule which contains at least one substituent group. As used herein, the term "polyarylene polymer" refers to polymers containing as polymerized units, one or more arylene monomers. A non-limiting example is poly(2-(3,4-ethylenedioxy)thienyl-(biphenyl)).

"Substituted" means a compound or radical substituted with at least one (e.g., 1, 2, 3, 4, 5, 6 or more) substituent group independently selected from a halogen atom (F, Cl, Br, or I), a hydroxy group, a nitro group, a cyano group, an amino group, an azido group, an amidino group, a hydrazino group, a hydrazono group, a carbonyl group, a carbamoyl group, a thiol group, an ester group, a carboxylic acid group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and a combination thereof, instead of hydrogen, provided that the substituted atom's normal valence is not exceeded.

As used herein, when a definition is not otherwise provided, the term "hetero" refers to a compound or group including 1 to 4 heteroatoms selected from N, O, S, Se, Te, Si, and P.

As used herein, when a definition is not otherwise provided, the term "alkyl" group refers to a straight or branched chain saturated aliphatic hydrocarbon having the specified number of carbon atoms, and having a valence of at least one, optionally substituted with one or more substituents where indicated, provided that the valence of the alkyl group is not exceeded.

As used herein, when a definition is not otherwise provided, the term "alkenyl" group refers to a straight or branched chain hydrocarbon that comprises at least one carbon-carbon double bond, having the specified number of carbon atoms, and having a valence of at least one, optionally substituted with one or more substituents where indicated, provided that the valence of the alkenyl group is not exceeded.

As used herein, when a definition is not otherwise provided, the term "alkynyl" group refers to a straight or branched chain, monovalent hydrocarbon group having at least one carbon-carbon triple bond, having the specified number of carbon atoms, and having a valence of at least one, optionally substituted with one or more substituents where indicated, provided that the valence of the alkynyl group is not exceeded.

As used herein, when a definition is not otherwise provided, the alkyl group, the alkenyl group, or the alkynyl group may be linear or branched. Examples of the alkyl group may be a methyl group, an ethyl group, an iso-propyl group, a tert-butyl group, a n-octyl group, a n-decyl group, a n-hexadecyl group, and the like. Examples of the alkenyl group may be a vinyl group, an allyl group, a 2-butenyl group, or 3-pentenyl group. Examples of the alkynyl group may be a propargyl group, or a 3-pentynyl group.

As used herein, when a definition is not otherwise provided, the term "cycloalkyl" group refers to a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups, and having a valence of at least one, and optionally substituted with one or more substituents where indicated, provided that the valence of the alkyl group is not exceeded.

As used herein, when a definition is not otherwise provided, the term "aryl" group refers to a cyclic group in which all ring members are carbon and at least one ring is aromatic, the group having the specified number of carbon atoms, for example a C6 to C30 aryl group, and specifically a C6 to C18 aryl group, and having a valence of at least one, optionally substituted with one or more substituents where indicated, provided that the valence of the aryl group is not exceeded. More than one ring may be present, and any additional rings may be independently aromatic, saturated or partially unsaturated, and may be fused, pendant, spirocyclic, or a combination thereof.

As used herein, when a definition is not otherwise provided, the term "amino group" refers to —NRR' wherein R and R' are independently hydrogen, a C1 to C20 alkyl group, or a C6 to C30 aryl group.

Hereinafter, a detailed description will be given of the present disclosure, with reference to the accompanying drawings.

There are numerous processes responsible for the modulation of visible light. Among them, electrochromic techniques can use the reversible change of color and/or optical density obtained by an electrochemical redox process in which the oxidized and the reduced forms have different colors, indices of refraction, or optical densities. As used herein, the term "electrochromic" refers to the property of changing light transmission properties in response to voltage.

By applying a voltage difference (ca. 1-5 V) to an electrochromic cell, the electrochromic material is oxidized or reduced, depending on the voltage polarity. The electrochromic effect is induced by the electrochemical redox processes which modify the electronic properties of the electrochromic material. In particular, the band gap of the material is modified by the redox processes, and this is correlated to a variation in absorption properties (opacity) and color.

In an exemplary embodiment, the opacity of the electrochromic filter may change the output of the filter. For systems using more than one electrochromic filter, each electrochromic filter may be independently switchable between a condition in which it at least partially absorbs visible light and a condition in which it is substantially permeable to visible light based on an applied voltage (the applied opacity voltage). In an embodiment, the opacity voltage is applied according to a predefined timing sequence, for use as a turn signal, for example.

In an exemplary embodiment, the electrochromic filter may control the color of the light output from the filter exit. Each electrochromic filter is independently tunable to produce a desired color output based on an applied voltage (the applied color voltage). In an embodiment, the color voltage is applied according to a predefined timing sequence. Both the opacity and color can be changed using a single electrochromic filter.

Figure 2:
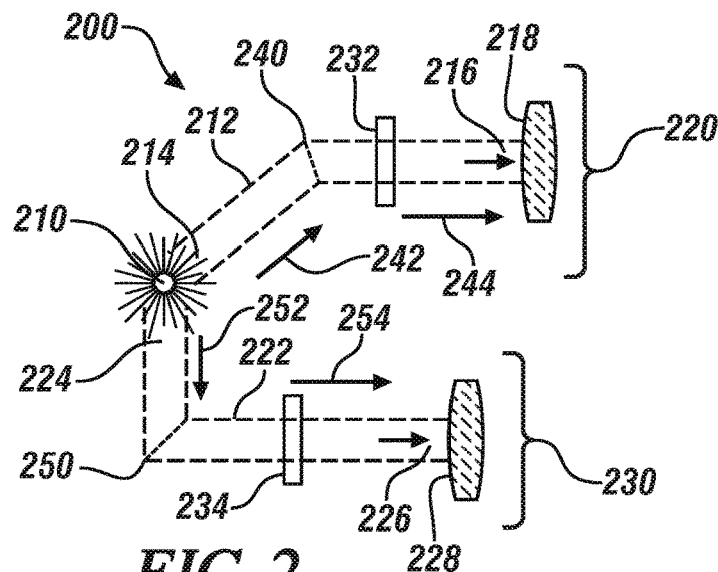
FIG. 2 is a is a schematic view of a lighting system according to an embodiment of the present disclosure.

In accordance with an exemplary embodiment of the disclosure, a lighting system is provided. FIG. 1 depicts a direct lighting system 100 that includes a light source 10, a first lighting subsystem 20, and a second lighting subsystem 30. In an embodiment, the direct lighting system 100 uses a direct lighting path between the lighting source 10 and the optional first lens 18 and the optional second lens 28. In alternate configurations, and as illustrated in FIG. 2, one or more of the lighting subsystems can use an indirect lighting path.

The light source may be any suitable light source that produces the desired luminous flux. In an exemplary embodiment, the light source may be incandescent, a light emitting diode (LED), an organic light emitting diode (OLED), fluorescent, halogen, high-intensity discharge (HID), or a combination thereof. In an exemplary embodiment, the light source may include more than one individual light source, for instance two, three, four, five, six, seven, or eight individual light sources can be used in together, and collectively represent the light source. For example, the light source can be an array of multiple LED light sources.

The first lighting subsystem 20 includes a first light path 12 that has a first end 14 positioned to receive light from the light source 10 and a second end 16 positioned to direct the light to an optional first lens 18. The subsystem further includes a first electrochromic filter 32 disposed in the first light path 12.

The second lighting subsystem 30 includes a second light path 22 having a first end 24 positioned to receive light from the light source 10 and a second end 26 positioned to direct the light to an optional second lens 28. The subsystem further includes a second electrochromic filter 34 disposed in the second light path 22.

The luminous flux generated by the light source is conveyed to the light path of each subsystem using any suitable light directing means and is not particularly limited. For example, the light path can be an optical waveguide, a light guide, a light bar, a light blade, a light pipe, a light fiber, a fiber bundle, a diffusive polymer light path, or a combination thereof. The light path may carry light from the headlamp subsystem to other subsystems having their own light sources, such as the opposite headlamp subsystem, to provide light source redundancy.

The light source can serve multiple lighting functions and provide multiple colors using multiple subsystems. For example, the light source can use light paths configured to provide the front lighting and light paths configured to provide the rear lighting. In an embodiment, one or more front lighting systems could provide side marker, parking light, turn signal, position indicator, and headlight functions using one or more subsystems. In an embodiment, one or more rear lighting systems could provide side marker, parking light, position indicator, turn signal, backup light, tail light, center high-mounted stop light (CHMSL), and stop light functions using one or more subsystems. For example, a combination stop/rear turn signal light may be modulated with a single or multiple lighting subsystem. In an embodiment, the light source uses light paths configured to provide light to one or more interior lights.

In an embodiment, the first lighting subsystem provides a first lighting function, and the second lighting subsystem provides a second lighting function. In an exemplary embodiment, the first lighting function and the second lighting function are the same. In another exemplary embodiment, the first lighting function and the second lighting function are different. For example, a lighting system or subsystem can be used for a daytime running lamp during daytime operation and be used as a position light, operating at reduced intensity, during night operation.

A light path may be encased in a layer of epoxy. The epoxy may have a lower index of refraction than the light path, so that a light ray passing through the light path is internally reflected at the light path/epoxy interface. The epoxy coating may be applied by dipping the light path in a reservoir of epoxy and allowing the coating to dry. The epoxy layer may prevent contaminants from reaching the internal light path/epoxy interface where reflection occurs. Plastic coatings may be applied to the outside surfaces of the epoxy layer, and clamps and other fixtures may be attached to the outside surfaces without affecting light transmission through the light path. A light path may be formed from polycarbonate (which has an index of refraction of 1.58) with an outer coating of acrylic (which has an index of refraction of 1.5). A light path may have a glass core and an outer coating having a lower index of refraction.

The light path may have integrated installation elements, such as snaps and detents. Snaps may be formed during the injection molding of the light path to provide a convenient means for securing the light path within the vehicle. The vehicle may have brackets to receive the snaps or a screw may be inserted into a snap to secure the light path to a mounting surface.

A light path may have a bend that is configured to allow a portion of the light travelling in the light path to escape at the bend. A lens may be used to focus the light to form a desired beam pattern. The amount of light released at the bend may be controlled by determining the outer radius of curvature of the bend relative to the width of the light path. The amount of light entering the lens may be proportional to the amount of light released at the bend.

The optional first lens 18 and optional second lens 28 can be an actual automotive lens. Any suitable lens material can be used, and the properties of the lens, including shape, thickness, color, density, coatings, and the like, are not limited. The lens can also include multiple lenses that are arranged in any suitable configuration. In an embodiment, the optional first lens 18 and the optional second lens 28 are not physical lenses, and represent a physical location to which the light source 10 is directed.

The lighting system may include additional lighting subsystems beyond a first and second subsystem. For example, the lighting system may include 2, 3, 4, 5, 6, 7, 8, 9, or 10 lighting subsystems that each have a light path positioned to receive light from the light source, although the number of lighting subsystems is not particularly limited. The lighting system can independently comprise both direct and indirect lighting subsystems. The additional light subsystems may further include an electrochromic filter disposed in each light path. In another exemplary embodiment, one or more of the lighting subsystems does not include an electrochromic filter in the light path.

FIG. 2 depicts an indirect lighting system 200 that uses indirect lighting subsystems. A first light path 212 includes a bend 240 that is configured to change the direction of light from a first direction 242 to a second direction 244. In an exemplary embodiment, a first electrochromic filter 232 may be positioned upstream or downstream from bend 240. In another exemplary embodiment, the first light path 212 may include a plurality of bends 240 to direct the light from the light source 210 to a first lens 218. Similarly, a second light path 222 may include a bend 250 that changes the direction of light from a first direction 252 to a second direction 254. In an exemplary embodiment, a second electrochromic filter 234 may be positioned upstream or downstream from the bend 250. In another exemplary embodiment, the second light path 222 may include a plurality of bends 250 to direct the light from the light source 210 to a second lens 228.

Figure 3:
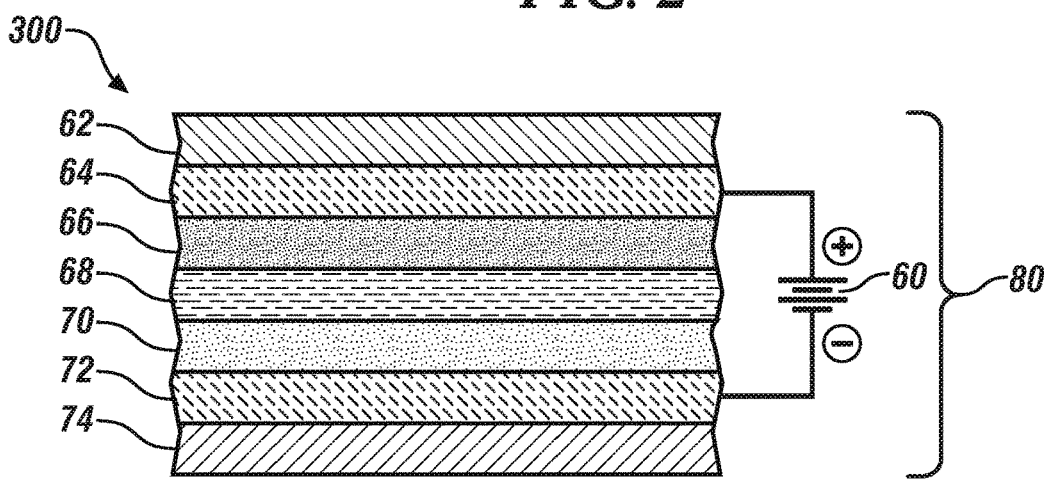
FIG. 3 is a schematic cross-sectional view of an electrochromic filter according to an embodiment of the present disclosure.
Figure 4:
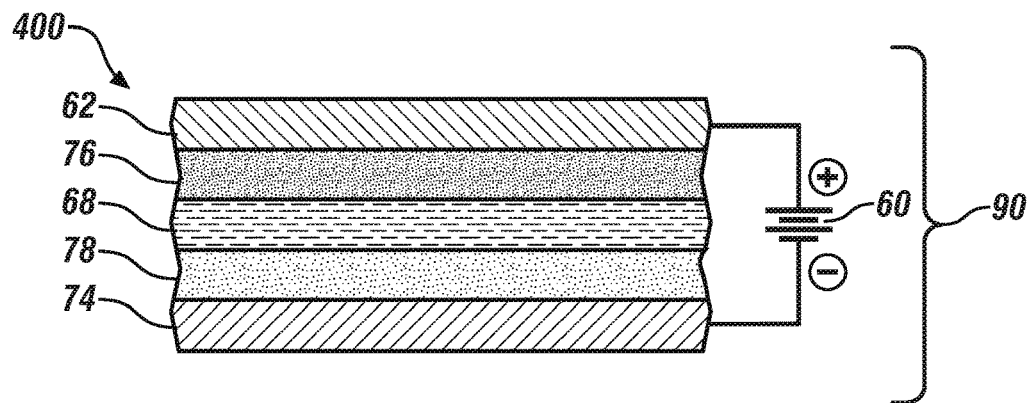
FIG. 4 is a schematic view of a lighting system according to an embodiment of the present disclosure.

Any suitable electrochromic filter, including those known in the art, may be used. FIG. 3 depicts an exemplary electrochromic filter having a seven layer structure 300. The structure includes a first substrate layer 62, a transparent conductor 64, an electrochromic polymer layer 66, an electrolyte 68, an ion storage layer 70 (e.g., a counter electrode), a second transparent conductor 72, and a second substrate layer 74. The electrochromic polymer layer 66 can be configured to be the cell anode (as shown in FIG. 3) or configured to be the cell cathode. In the two cases it is respectively termed an anodically or cathodically coloring material, i.e., it shows color variation when it is oxidized or reduced. Alternatively, two or more electrochromic species can be present in two symmetrically arranged layers; for such a case, the cathodic and anodic coloration processes are simultaneously driven. In another exemplary embodiment, the electrochromic filter may include a five layered structure 400, as shown in FIG. 4. The five-layered structure includes a first substrate layer 62, an electrochromic polymer layer 76, an electrolyte 68, a second electrochromic polymer layer 78, and a second substrate layer 74. In an embodiment, the first substrate layer 62 and the second substrate layer 74 can be a first transparent conductor layer and a second transparent conductor layer. Any suitable transparent conductor material(s) can be used for the transparent conductor layers. The five-layered and seven-layered structures are exemplary structures, and any suitable structural arrangement that comprises at least one electrochromic polymer layer can be used.

In an embodiment, the first and second substrate layers 62, 74 can be any material which is substantially transparent and has sufficient strength to be able to operate in the conditions, e.g., varying temperatures and pressures, commonly found in the automotive environment. The substrate layers may comprise any type of borosilicate glass, soda lime glass, float glass, or any other material, such as, for example, a polymer or plastic, that is transparent in the visible region of the electromagnetic spectrum.

The electrochromic polymer layers 76, 78 may include any suitable electrochromic material, including but not limited to organic polymers, viologens, metallopolymers, and metallophthalocyanines. In an embodiment, the electrochromic material is an electrochromic polymer. Table 1 lists several electrochromic polymers and their associated colors. The electrochromic polymers listed in Table 1 are non-limiting. By combining appropriate electrochromic materials, such as electrochromic polymers, in the electrochromic layers, various colors may be obtained.

TABLE 1

| Polymer | Reduced state | Oxidized state |
| --- | --- | --- |
| Polynorbornenes | Colorless | Blue/violet |
| Polyanilines | Colorless | Green |
| Polyamides | Colorless | Light blue |
| Polyamines | Colorless | Dark red |
| Poly-o-phenylenediamine | Colorless | Red/brown |
| Polyimides | Light green | Blue/violet |
| Polythiophenes | Green | Brown |
| Poly(3-methyl thiophene) | Red | Light blue |
| 3,4-polyethylene dioxythiophene | Dark blue | Light blue |
| Polypyrroles | Yellow | Blue violet |
| 3,4-polyethylene dioxypyrrole | Red | Colorless |
| Poly(3,4-(2,2-dimethylpropylenedioxy)-pyrrole) | Red-orange | Colorless |
| Poly(3,6-bis(3,4-ethylenedioxy)thienyl)-N-methylcarbazole) | Yellow | Blue |
| Poly(2-(3,4-ethylenedioxy)thienyl-(biphenyl)) | Brown | Black |

More than one electrochromic layer can be used in a single electrochromic filter, and the thickness of each electrochromic layer can be the same or different. The thickness of each electrochromic layer can also be adjusted according to the desired thickness of the electrochromic filter. In an embodiment, two or more electrochromic filters can be disposed on each other to provide for a unified electrochromic filter. In the unified electrochromic filters, an individual voltage can be selectively applied to each individual electrochromic filter to control opacity, color, or both.

The thickness of the electrochromic filter is limited to the minimum thickness necessary to provide a desired function and a suitable durability. In an exemplary embodiment, the electrochromic filters have a thickness of about 0.001 millimeters to about 10 millimeters, about 0.01 millimeters to about 1 millimeter, about 0.05 millimeters to about 1 millimeter, or about 0.1 millimeters to about 1 millimeter. In an exemplary embodiment, the first electrochromic filter has a thickness 80 that is the same as the thickness 90 of the second electrochromic filter. In another exemplary embodiment, the first electrochromic filter and the second electrochromic filter have a different thickness than each other.

Figure 5:
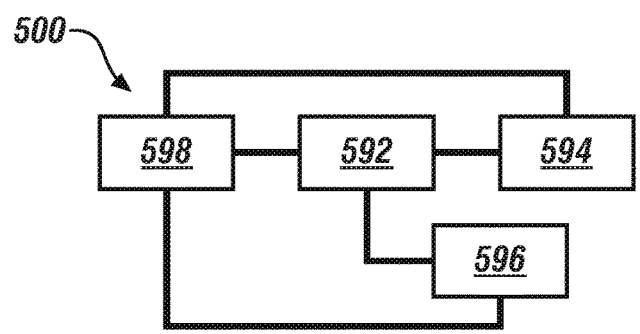
FIG. 5 is a schematic view of a lighting system according to an embodiment of the present disclosure.

FIG. 5 illustrates a lighting system 500 that includes a microelectronic controller 592 that is in operative communication with a voltage source 598 and with each of a first lighting subsystem 594 and a second lighting subsystem 596. Any suitable microelectronic controller may be used, and the microelectronic controller is configured to operate (actuate) multiple features of the lighting system, including the power to the light source, the voltage applied to the electrochromic filters, and other common electrical functions. The controller is able to actuate each of the light sources, the first electrochromic filter, and the second electrochromic filter independently from one another.

In an embodiment, the microelectronic controller can be centralized and provide control over any number of lighting systems and lighting subsystems. In another embodiment, the microelectronic controller can be localized at any of the light sources or electrochromic filters. The lighting systems and subsystems can be controlled using any suitable combination of centralized and localized microcontrollers. A single voltage source can be used to provide power to a plurality of microcontrollers. In an embodiment, a plurality of voltage sources can be used to provide power to one or more microcontrollers. As used herein, when a voltage source provide power to one or more microcontrollers, the voltage source can also provide power to one or more electrochromic filters.

Figure 6:
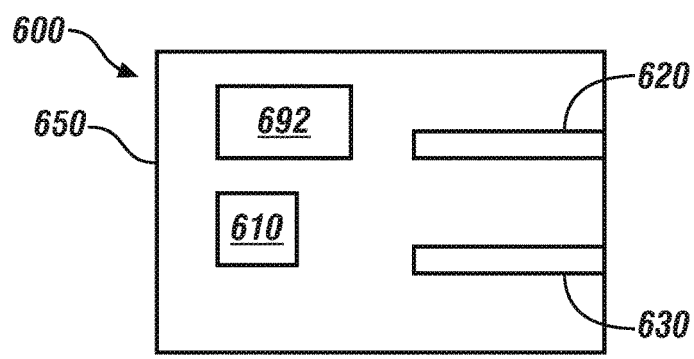
FIG. 6 is a schematic view of a lighting system according to an embodiment of the present disclosure.

FIG. 6 illustrates a lighting system 600 that includes a mounting surface 650 that is configured to secure a first lighting subsystem 620, a second lighting subsystem 630, a light source 610, and a microelectronic controller 692. The mounting surface may be manufactured using any suitable materials and any suitable process.

Figure 7:
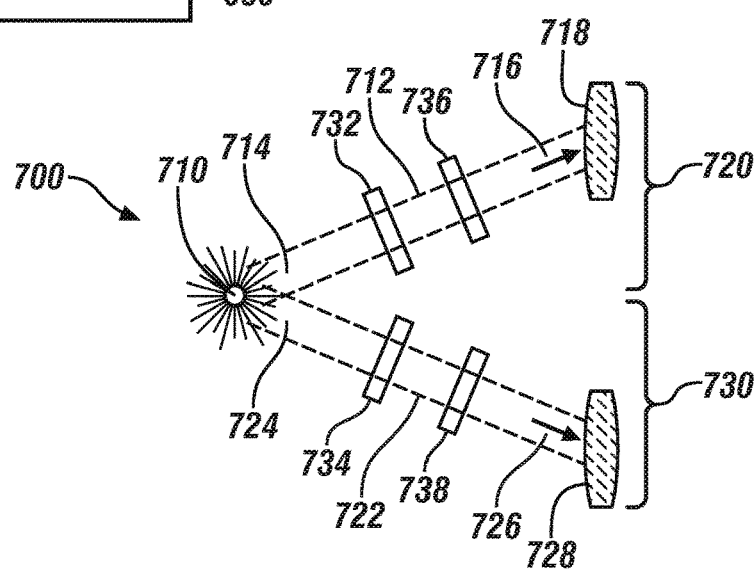
FIG. 7 is a schematic view of a lighting system according to an embodiment of the present disclosure.

According to another exemplary embodiment, each light path may include two separate electrochromic filters. FIG. 7 depicts a direct lighting system 700 that includes a light source 710. A first lighting subsystem 720 includes a first light path 712 having a first end 714 positioned to receive light from the light source 710 and a second end 716 positioned to direct the light to a first lens 718. A first electrochromic filter 732 and a third electrochromic filter 736 are disposed in the first light path 712, and thus the first electrochromic filter 732 may be upstream from the third electrochromic filter 736. In another exemplary embodiment, the third electrochromic filter 736 may be positioned upstream from the first electrochromic filter 732.

Referring back to FIG. 7, the direct lighting system 700 further includes a second lighting subsystem 730 that includes a second light path 722 having a first end 724 positioned to receive light from the light source 710 and a second end 726 positioned to direct the light to a second lens 728. A second electrochromic filter 734 and a fourth electrochromic filter 738 are disposed in the second light path 722, and thus the second electrochromic filter 734 may be upstream from the fourth electrochromic filter 738. In another exemplary embodiment, the fourth electrochromic filter 738 may be positioned upstream from the second electrochromic filter 734.

Figure 8:
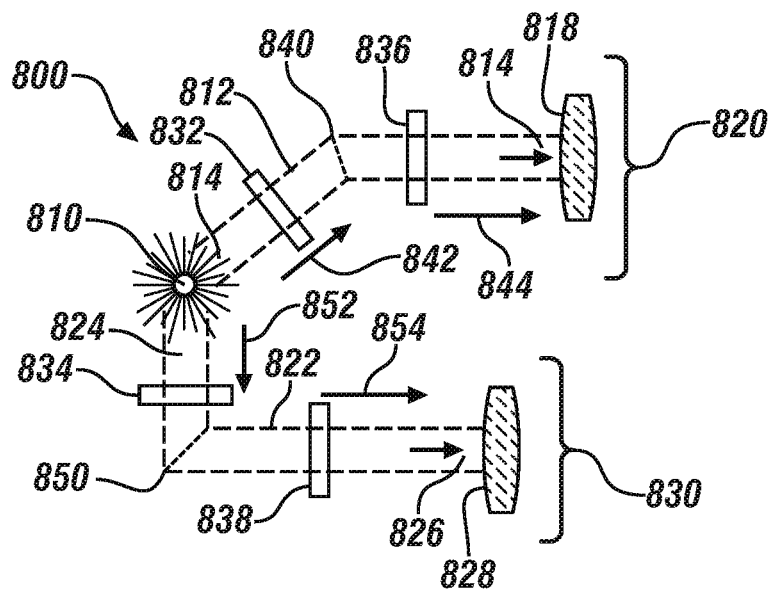
FIG. 8 is a schematic view of a lighting system according to an embodiment of the present disclosure.

FIG. 8 illustrates an indirect lighting system, wherein the light paths bend. The indirect lighting system 800 includes a first light path 812 that includes a bend 842 that is configured to change the direction of the light from a first direction 842 to a second direction 844. In an exemplary embodiment, the first electrochromic filter 832 may be positioned upstream or downstream from bend 840. Similarly, the third electrochromic filter 836 may be positioned upstream or downstream from bend 840. As described above, the relative order of the first and third electrochromic filters may be varied, and both filters may be positioned upstream or downstream from the bend 840. In another exemplary embodiment, the first light path 812 may include a plurality of bends 840 to direct the light from the light source 810 to a first lens 818.

The second light path 822 can include a bend 850 that changes the direction of the light from a first direction 852 to a second direction 854. In an exemplary embodiment, the second electrochromic filter 834 may be positioned upstream or downstream from the bend 850. In an embodiment, the fourth electrochromic filter 838 may be positioned upstream or downstream from the bend 850. As described above, the relative order of the second and fourth electrochromic filters may be varied, and both filters may be positioned upstream or downstream from the bend 850. In another exemplary embodiment, the second light path 822 may include a plurality of bends 850 to direct the light from the light source 810 to a second lens 828.

Figure 9:
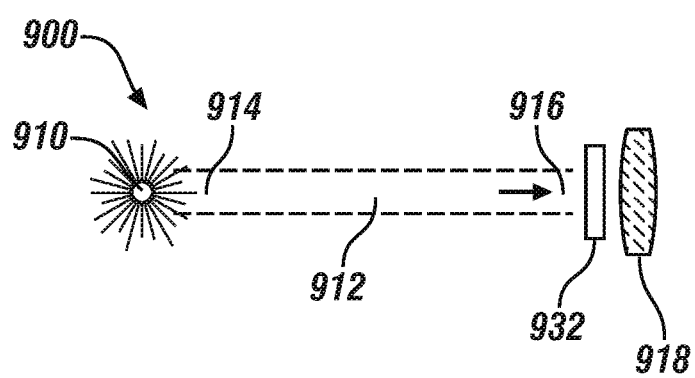
FIG. 9 is a schematic view of a lighting system according to an embodiment of the present disclosure.
Figure 10:
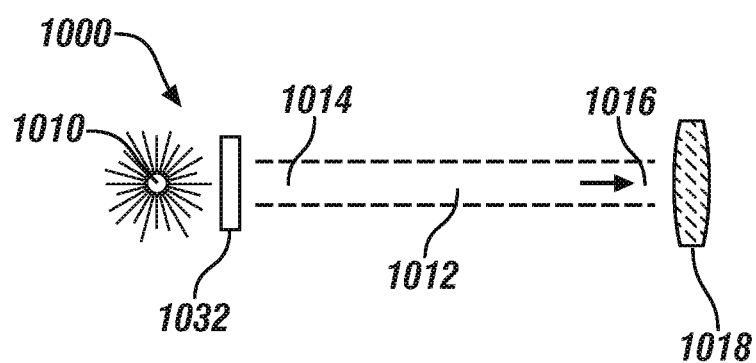
FIG. 10 is a schematic view of a lighting system according to an embodiment of the present disclosure.

In an exemplary embodiment, the electrochromic filter may be disposed between the second end of the light path and the lens. FIG. 9 shows an electrochromic filter 932 that is disposed downstream of a second end 916 of light path 912. In another exemplary embodiment, the electrochromic filter may be disposed between the light source and the first end of the light path. FIG. 10 shows an electrochromic filter 1032 that is disposed upstream of a first end 1014 of light path 1012. The arrangements shown in FIGS. 9 and 10 can be used in direct and indirect lighting subsystems.

In another exemplary embodiment, a method includes providing vehicle lighting by producing a light with a light source and transmitting a first portion of the light to a first lighting subsystem. The first lighting subsystem is as described above, and includes a first light path having a first end that receives the first portion of the light from the light source and a second end that directs the first portion of the light to a first lens, and a first electrochromic filter disposed in the first light path. A second portion of the light is transmitted to a second lighting subsystem. The second lighting subsystem is as described above, and includes a first end that receives the second portion of light and a second end that direct the second portion of light to a second lens. A second electrochromic filter is disposed in the second light path.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle lighting system comprising:
   a light source;
   a first lighting subsystem comprising:
      a first light path having a first end positioned to receive light from the light source and to deliver the light to a second end of the first light path; and
      a first electrochromic filter disposed in the first light path,
      wherein color of the first electrochromic filter is tunable based on a first applied color voltage, and
      wherein opacity of the first electrochromic filter is tunable based on a first applied opacity voltage; and
   a second lighting subsystem comprising:
      a second light path having a first end positioned to receive light from the light source and to deliver the light to a second end of the second light path; and
      a second electrochromic filter disposed in the second light path, wherein color of the second electrochromic filter is tunable based on a second applied color voltage, and wherein opacity of the second electrochromic filter is tunable based on a second applied opacity voltage, wherein the first lighting subsystem provides a first lighting function, and wherein the second lighting subsystem provides a second lighting function.

2. The system of claim 1, wherein at least one of the first light path and the second light path further comprises a bend that is configured to change a direction of light from a first direction to a second direction, wherein the second direction is different than the first direction.

3. The system of claim 1, wherein the first applied opacity voltage is applied according to a first predefined timing sequence and the second applied opacity voltage is applied according to a second predefined timing sequence.

4. The system of claim 1, wherein the first applied color voltage is applied according to a first predefined timing sequence; or the second applied color voltage is applied according to a second predefined timing sequence; or a combination thereof.

5. The system of claim 1, wherein the first electrochromic filter and the second electrochromic filter each independently has a thickness of about 0.001 millimeters to about 10 millimeters.

6. The system of claim 1, wherein the first electrochromic filter and the second electrochromic filter each independently comprises at least one electrochromic polymer layer.

7. The system of claim 1, further comprising a microelectronic controller and a voltage source.

8. The system of claim 1, wherein the light source, the first electrochromic filter, and the second electrochromic filter can each be actuated independently from each other during operation of the system.

9. The system of claim 1, further comprising a mounting surface.

10. The system of claim 1, wherein the first lighting function is an interior light, a headlamp, a tail light, a turn signal, a side marker, or a parking light, and wherein the second lighting function is an interior light, a headlamp, a tail light, a turn signal, a side marker, daytime running lamp, position indicator, or a parking light.

11. A lighting system comprising:
a light source;
a first lighting subsystem comprising:
a first light path having a first end positioned to receive light from the light source and to deliver the light to a second end of the first light path;
a first electrochromic filter disposed in the first light path; and
a third electrochromic filter disposed in the first light path,
wherein color of the third electrochromic filter is tunable based on a third applied color voltage, and
wherein opacity of the third electrochromic filter is tunable based on a third applied opacity voltage; and
a second lighting subsystem comprising:
a second light path having a first end positioned to receive light from the light source and to deliver the light to a second end of the second light path;
a second electrochromic filter disposed in the second light path; and
a fourth electrochromic filter disposed in the second light path, wherein color of the fourth electrochromic filter is tunable based on a fourth applied color voltage, and wherein opacity of the fourth electrochromic filter is tunable based on a fourth applied opacity voltage, wherein the first lighting subsystem provides a first lighting function, and wherein the second lighting subsystem provides a second lighting function.

12. The system of claim 11, wherein at least one of the first light path and the second light path further comprises a bend that is configured to change a direction of light from a first direction to a second direction, wherein the second direction is different than the first direction.

13. The system of claim 11, wherein the first applied opacity voltage is applied according to a first predefined timing sequence and the second applied opacity voltage is applied according to a second predefined timing sequence.

14. The system of claim 11, wherein the third applied color voltage is applied according to a third predefined timing sequence; or the fourth applied color voltage is applied according to a fourth predefined timing sequence; or a combination thereof.

15. The system of claim 11, wherein the first electrochromic filter is positioned downstream of the third electrochromic filter in the first light path, and the second electrochromic filter is positioned downstream of the fourth electrochromic filter in the second light path.

16. The system of claim 11, wherein the third electrochromic filter is positioned downstream of the first electrochromic filter in the first light path, and the fourth electrochromic filter is positioned downstream of the second electrochromic filter in the second light path.

17. A method for providing vehicle lighting comprising:
producing a light with a light source;
transmitting a first portion of the light to a first lighting subsystem, the first lighting subsystem comprising:
a first light path having a first end that receives the first portion of the light from the light source and directs the first portion of the light to a second end of the first light path; and
a first electrochromic filter disposed in the first light path,
wherein color of the first electrochromic filter is tunable based on a first applied color voltage, and
wherein opacity of the first electrochromic filter is tunable based on a first applied opacity voltage; and
transmitting a second portion of the light to a second lighting subsystem, the second lighting subsystem comprising:
a second light path having a first end that receives the second portion of the light from the light source and directs the second portion of the light to a second end of the second light path; and
a second electrochromic filter disposed in the second light path,
wherein color of the second electrochromic filter is tunable based on a second applied color voltage, and
wherein opacity of the second electrochromic filter is tunable based on a second applied opacity voltage,
wherein the first lighting subsystem provides a first lighting function, and
wherein the second lighting subsystem provides a second lighting function.

18. The method of claim 17, further comprising changing an opacity of the first electrochromic filter or the second electrochromic filter by applying an opacity voltage to the first electrochromic filter or the second electrochromic filter.

19. The method of claim 17, further comprising changing the color of the first electrochromic filter by applying the first color voltage to the first electrochromic filter; or changing the color of the second electrochromic filter by applying the second color voltage to the second electrochromic filter; or a combination thereof.

20. The method of claim 17, further comprising independently actuating each of the light source, the first electrochromic filter, and the second electrochromic filter.

* * * * *